(12) United States Patent
Kim et al.

(10) Patent No.: US 8,519,827 B2
(45) Date of Patent: Aug. 27, 2013

(54) METHOD OF GENERATING ACTIVATION CODE FOR RADIO FREQUENCY IDENTIFICATION TAG

(75) Inventors: Hyunseok Kim, Daejeon (KR); Su Na Choi, Gwangju (KR); Heyung Sub Lee, Daejeon (KR); Nak Seon Seong, Daejeon (KR); Cheol Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1103 days.

(21) Appl. No.: 12/251,890

(22) Filed: Oct. 15, 2008

(65) Prior Publication Data
US 2009/0153329 A1 Jun. 18, 2009

(30) Foreign Application Priority Data
Dec. 17, 2007 (KR) .......................... 10-2007-0132210

(51) Int. Cl.
*H04Q 5/22* (2006.01)
(52) U.S. Cl.
USPC .................... 340/10.32; 340/10.1; 340/572.1

(58) Field of Classification Search
USPC ............. 340/10.1, 10.3, 10.31, 10.32, 10.51, 340/10.52, 572.1
See application file for complete search history.

(56) References Cited

U.S. PATENT DOCUMENTS

| | | | |
|---|---|---|---|
| 6,172,596 B1* | 1/2001 | Cesar et al. ................ | 340/10.41 |
| 6,967,564 B2* | 11/2005 | Hulvey ...................... | 340/10.31 |
| 7,239,229 B2* | 7/2007 | Bauhahn .................... | 340/10.42 |
| 2002/0033757 A1* | 3/2002 | Rodgers et al. ............ | 340/572.1 |
| 2005/0140502 A1* | 6/2005 | Ashizawa ................... | 340/10.52 |
| 2007/0018794 A1 | 1/2007 | Bares et al. | |

FOREIGN PATENT DOCUMENTS
KR 100779109 B1 11/2007

* cited by examiner

*Primary Examiner* — Edwin Holloway, III
(74) *Attorney, Agent, or Firm* — Kile Park Reed & Houtteman PLLC

(57) ABSTRACT

Disclosed is a method of generating an activation code of a Radio Frequency Identification (RFID) tag including calculating K satisfying a condition that N is set to exceed $2^{k-1}$ and to be equal to or less than $2^k$, when classifying N number of objects through a plurality of RFID tags; and classifying the N number of objects by recording a code corresponding to each of the N number of objects in a K-bit region in an activation code of each RFID tag.

11 Claims, 3 Drawing Sheets

FIG. 3

| BIT | CLASSIFICATION | CODE FOR OBJECT |
|---|---|---|
| 1,2 | LARGE CLASSIFICATION | 00 FRESH FOOD<br>01 DEHYDRATED FOOD<br>10 FROZEN FOOD<br>11 OTHER FOOD |
| 3,4,5 | MEDIUM CLASSIFICATION | 000 VEGETABLE<br>001 FRUIT<br>010 MEET<br>011 FISH<br>100 CANDY<br>101...111 AND THE LIKE |
| 6,7,8 | SMALL CLASSIFICATION | WHEN MEDIUM CLASSIFICATION IS VEGETABLE,<br>000 BROCCOLI<br>001 CARROT<br>010 CAULIFLOWER<br>011 CUCUMBER<br>100 POTATO<br>101 SQUASH<br>110 TOMATO<br>111 ZUCCHINI |

METHOD OF GENERATING ACTIVATION CODE FOR RADIO FREQUENCY IDENTIFICATION TAG

CROSS-REFERENCE TO RELATED APPLICATION

This application claims the benefit of Korean Patent Application No. 10-2007-0132210, filed on Dec. 17, 2007, in the Korean Intellectual Property Office, the disclosure of which is incorporated herein by reference.

BACKGROUND OF THE INVENTION

1. Field of the Invention

The present invention relates to generating an activation code (AC) of a Radio Frequency Identification (RFID) tag, in particular, to record a binary number code having a certain number of bits depending on a number of objects intended to be classified in the AC of the RFID tag, so as to classify the objects through the AC of the RFID tag.

This work was supported by the IT R&D program of MIC/IITA. [2005-S-106-03, Development of Sensor Tag and Sensor Node Technologies for RFID/USN]

2. Description of Related Art

In general, a Radio Frequency Identification (RFID) technology may refer to a technology which may recognize a unique identification of a tagged object via a radio signal to collect, store, process, and trace corresponding information, thereby providing services such as location determination, remote processing, management, information exchange between the tagged objects, and the like with respect to the tagged object. The RFID technology may be applicable to a variety of fields such as materials management, distribution, security, and the like by replacing existing bar code, so that a new market is expected to be formed.

The RFID tag is classified into a passive type when a tag without a battery uses a signal of a reader to generate power, and an active type when a tag with a battery uses a self-contained battery to operate under its own power.

The passive type of tag is comprised of an antenna and a tag chip and the tag chip is comprised of a voltage multiplier, a modulator, a demodulator, a clock generator, a decoder, a controller, an Electrically Erasable Programmable Read-Only Memory (EEPROM) [110], and the like. The voltage multiplier receives an electromagnetic wave through the antenna to generate DC voltage and embodies a configuration circuit of a tag including the EEPROM. However, since a value of the generated voltage is proportional to strength of the electromagnetic wave transmitted from the reader, there is a problem that the passive tag may have difficulty in generating a required voltage when a distance between the reader and the tag is more than a predetermined distance (usually around 5 m).

Conversely, since the tag with a battery is able to be provided with a stable source of electricity using a contained battery, there is an effect that recognition distance extends more than 30 m, unlike the passive tag. However, the life span of the tag is limited to the life span of the contained battery, thus a low power technique to prolong the life span of the battery is required.

Most of circuit of the tag with a battery stays in an inactive state or an idle mode, to prevent unnecessary power consumption, and when a wake-up signal is transmitted from a reader, the whole tag is activated in a short time and then returns to the idle mode after an appropriate amount of time. Accordingly, the circuit for sensing the wake-up signal from the reader is required to be active even when the tag is in an idle mode. Also, since the time of remaining in an idle mode is much longer than that of an active mode, a amount of a stand-by current generated by the circuit is a main factor to determine the life span of the tag.

In the tag with a battery, a reader may transmit an active command including an active mask to the tag, and the tag may identify whether the active mask received from the reader is the same as its own activation mask and determine whether to perform a wake-up.

Currently, International Electrotechnical Commission/International Electrotechnical Commission (ISO/IEC) 18000-6 Rev1.2, one of the committee drafts (CD) of 900 MHz RFID protocol, does not mention a method of generating an activation code (AC). That is, the AC is not a main subject in standardizing a RFID protocol and can be variously defined according to each application.

As is well known, ISO/IEC 18000-6 Rev1.2 does not define a specific standard relating with generating the AC, however, it describes that the AC can be a random value, Unique Item Identifier (UII), or a predetermined portion thereof.

Accordingly, there is a need for a method of generating an AC which can classify object that a user desires to activate using the AC, and activate the classified objects.

SUMMARY OF THE INVENTION

An aspect of the present invention provides a method of generating an activation code (AC) of a Radio Frequency Identification (RFID) tag, wherein a binary number code having a predetermined number of bits depending on a number of objects intended to be classified is recorded in the AC of the RFID tag, thereby classifying the objects through the AC of the RFID tag.

According to an aspect of an example embodiment of the present invention, there is provided a method of generating an AC of an RFID tag includes calculating a K satisfying a condition that N is set to exceed $2^{k-1}$ and to be equal to or less than $2^k$ when classifying N number of objects through a plurality of RFID tags and classifying the N number of objects by recording a code corresponding to each of the N number of objects in a K-bit region in an AC of each RFID tag.

Also, in an aspect of an example embodiment, the classifying includes generating N number of K-bit binary number codes respectively corresponding to the N number of objects intended to be classified and recording each of the generated K-bit binary number codes in the AC of each RFID.

Also, in an aspect of an example embodiment, the classifying includes generating N number of binary number codes respectively corresponding to the N number of objects intended to be classified when classifying the N number of objects through at least one piece of depth information and recording each of the generated binary number codes in the AC of each RFID tag, and the binary number code is embodied as a binary number code a number of bits of which is equal to or less than K-bit.

Also, a method of generating AC of an RFID according to an aspect of an example embodiment further includes recording each of the codes recorded in the AC of each RFID, in an activation mask included in an activation command of an RFID reader corresponding to each RFID tag.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 illustrates a code assigned to 256 classification objects according to an example embodiment.

DETAILED DESCRIPTION OF EXEMPLARY EMBODIMENTS

Figure 1:
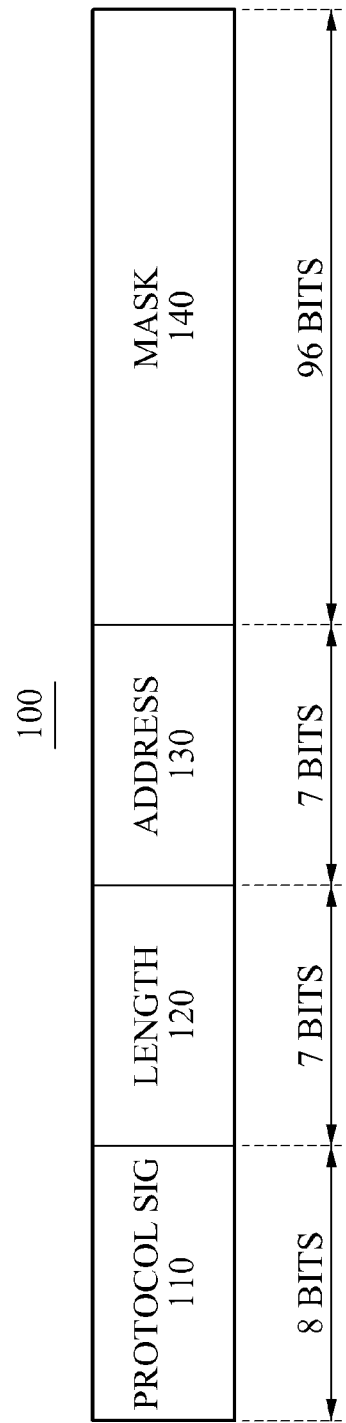
FIG. 1 illustrates a format of an activation command according to International Organization for Standardization/International Electrotechnical Commission (ISO/IEC) 18000-6 Rev1.2 committee draft.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

International Organization for Standardization/International Electrotechnical Commission (ISO/IEC) 18000-6 Rev1.2 committee draft describes two types of activation command structures. A body describes a structure of an activation command including eight bits to 96 bits of an activation mask and an appendix describes a structure of an activation command including up to 96 bits of an activation mask when using a Manchester code. In the present invention, the latter is described first for ease of description.

FIG. 1 illustrates a structure of an activation command using a Manchester code according to an appendix of ISO/IEC 18000-6 Rev1.2 committee draft (CD).

As shown in FIG. 1, an activation command 100 according to the appendix of ISO/IEC 18000-6 Rev1.2 CD includes to a protocol signal region (PROTOCOL SIG) 110, a length region (LENGTH) 120, an address region (ADDRESS) 130, and an activation mask region (MASK) 140. Eight bits are assigned to the protocol signal 110, seven bits are assigned to the length region 120, seven bits are assigned to the address region 130, and 96 bits are assigned to the activation mask region 140.

As described above, in the activation command according to the appendix of ISO/IEC 18000-6 Rev1.2 CD, the activation mask 140 may be embodied as one bit to 96 bits. Thus, when the activation mask 140 is one bit, the activation mask 140 may classify $2^1$ objects, and when the activation mask 140 is 96 bits, the activation mask 140 may classify $2^{96}$ objects.

Also, according to ISO/IEC 18000-6 Rev1.2 CD, an activation mask may be embodied as eight bits to 96 bits. In this instance, a number of objects, which can be classified, may be $2^8$ to $2^{96}$.

Thus, the activation mask(140) according to the present invention may be embodied as an activation mask according to the appendix of ISO/IEC 18000-6 Rev1.2 CD, when the activation mask(140) of the present invention classifies less than $2^8$ objects. Also, the activation mask(140) according to the present invention may be embodied as either an activation mask according to the appendix of ISO/IEC 18000-6 Rev1.2 CD or an activation mask according to ISO/IEC 18000-6 Rev1.2 CD, when the activation mask(140) of the present invention classifies $2^8$ to $2^{96}$ objects.

Figure 2:
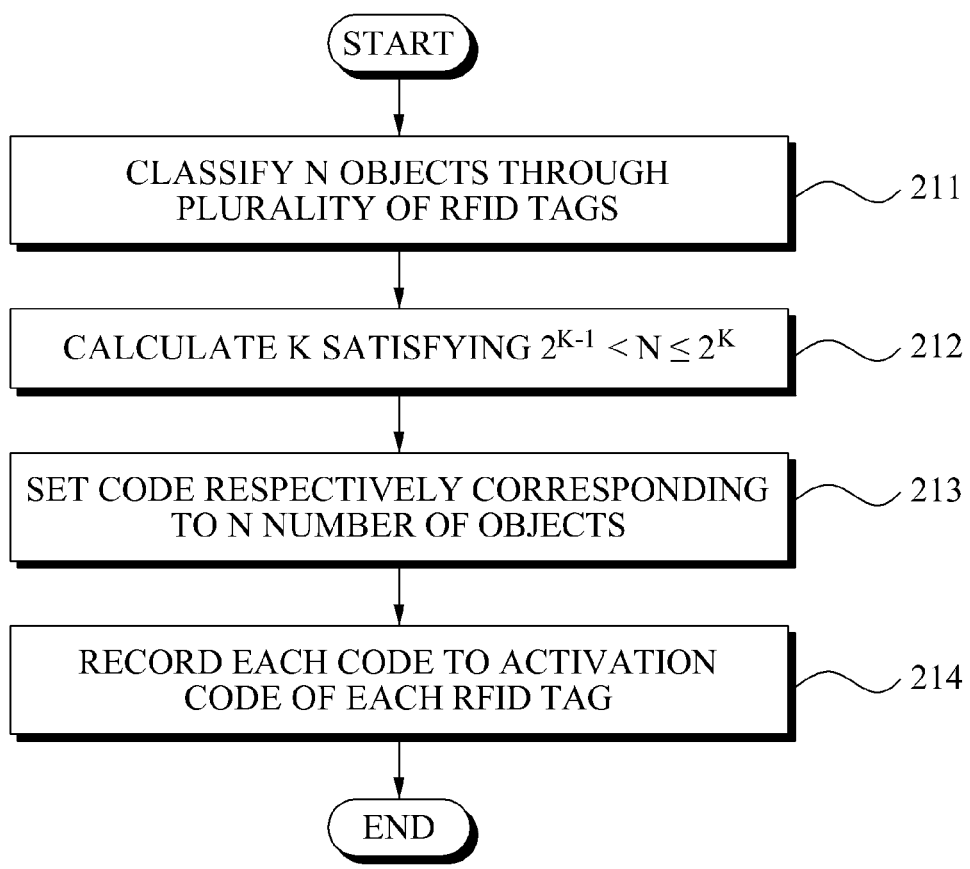
FIG. 2 is a flowchart illustrating a method of generating an activation code (AC) of an Radio Frequency Identification (RFID) tag according to an example embodiment.

FIG. 2 is a flowchart illustrating a method of generating an AC of an RFID tag according to an example embodiment.

As described above, in a tag with a battery, an RFID reader transmits an activation command including an activation mask to an RFID tag, the RFID tag compares the activation mask included in the activation command received from the RFID reader is identical with an AC that the RFID tag has itself. When the activation mask included in the activation command is identical with the AC of the RFID, the RFID tag is activated. However, when the activation mask included in the activation command is not identical with the AC of the RFID, the RFID tag stays in an inactive state.

Therefore, according to the present invention, the activation mask and the AC may be embodied to have the identical data structure. Accordingly, for convenience of description, the present specification describes a method of generating an AC by referring to an example of an AC that an RFID tag maintains.

Also, a method of generating an AC of an RFID according to the present invention may be embodied through a terminal or a type of server for controlling the RFID tag, which can record data in an AC of the RFID. Also, a method of generating an AC of an RFID according to the present invention may be embodied through a computing apparatus that performs a data process of the RFID tag in a generating process of the RFID tag.

Meanwhile, FIG. 2 illustrates an example that a method of generating an RFID AC is embodied through an AC generating server including an algorithm according to the method of generating the AC of the RFID is described.

The AC generating server may classify N objects through N RFID tags according to a request from a user in operation 211.

In this instance, the AC generating server may calculate K satisfying a condition that N is set to exceed $2^{k-1}$ and to be equal to or less than $2^k$ in operation 212. For example, when N is 256, the AC generating server may calculate K as 8 according to $2^7 < 256 \leq 2^8$.

The AC generating server sets a code respectively corresponding to N number of objects in operation 213. For example, when N is 256 and K is 8, the AC generating server may set a code to 00000000 for a first object, set a code to 00000010 for a second object, and set a code to 11111111 for an $N^{th}$ object.

Also, the AC generating server may set a code for each object through a variety of classification methods, besides the method of setting a code according to the classification of objects.

For example, when a number of objects intended to be classified are two, such as a fish tag and a vegetable tag, the AC generating server may set a code with one bit corresponding to the two objects. That is, the AC generating server assigns 0 to an AC of the fish tag, and assigns 1 to an AC of the vegetable tag. Thus, the AC generating server may classify the fish tag and the vegetable tag by using only one bit for each AC of the fish tag and the vegetable tag.

Also, when the number of objects intended to be classified are 256, the AC generating server may respectively classify the 256 objects through a large classification, a medium classification, and a small classification, and this is described below referring to FIG. 3.

FIG. 3 illustrates a code assigned to 256 classification objects according to an example embodiment.

As illustrated in FIG. 3, the AC generating server may assign two bits to the large classification, three bits to the medium classification, and three bits to the small classification.

For example, the large classification may be comprised of a fresh food, a dried food, a frozen food, and other food. Also, the medium classification may be comprised of a vegetable, a fruit, a meat, a fish, and the like. Also, the small classification may be comprised of a broccoli, a carrot, a potato, a squash, a tomato, and the like.

The AC generating server may assign a code '00' to the fresh food, a code '01' to the dried food, a code '10' to the frozen food, and a code '11' to the other food among the food in the large classification.

Also, the AC generating server may assign a code '000' to the vegetable, a code '001' to the fruit, a code '010' to the meat, a code '011' to the fish, and a code '100' to a candy among the food in the medium classification.

Also, the AC generating server may respectively assign a code '000' to the broccoli, a code '001' to the carrot, a code '010' to a cauliflower, a code '011' to a cucumber, a code '100' to the potato, a code '101' to the squash, a code '110' to the tomato, and a code '111' to a zucchini among the food in the small classification.

Thus, a code '10000001' may be recorded in an AC of a tag to be attached to a frozen vegetable carrot. Also, a code '00000110' may be recorded in an AC of a tag to be attached to a fresh vegetable tomato.

When these codes are respectively assigned to each RFID tag, an RFID reader may wake-up a tag desired by a user through a combination of each code.

For example, when a user wants to wake-up tags attached to all the frozen food, the RFID transmits an activation command in which a code '10' is recorded as an activation mask to all the RFID tags, and thus the tags attached to all the frozen food are wake-up.

Also, when a user wants to wake-up only a tag attached to a frozen carrot, the RFID transmits an activation command in which a code '10000001' is recorded as an activation mask to all the RFID tags, and thus only the tag attached to a frozen carrot is woke-up.

Again in FIG. 2, the AC generating server respectively records each generated code to the AC of each RFID tag in operation 214.

Subsequently, the AC generating server may provide information for each code recorded in the AC of each RFID tag to the RFID reader, so as to control the RFID reader to wake-up only an RFID tag desired by a user through the activation mask.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of generating an activation code (AC) of a Radio Frequency Identification (RFID) tag, the method comprising:
    calculating a K satisfying a condition that N is set to exceed $2^{K-1}$ and to be equal to or less than $2^K$, when classifying N number of objects through a plurality of RFID tags, wherein K is greater than or equal to 2; and
    classifying each object in the N number of objects by:
        assigning a classification and a sub-classification to the object;
        generating a code for the object, such that the code comprises K bits, and such that a first portion of the code corresponds to the classification of the object and a second portion of the code corresponds to the sub-classification of the object, wherein the first portion of the code comprises X bits wherein the first and second portions of the code to ether comprise Y bits, and wherein Y is less than or equal to K; and
        recording, using a processing device, the code for the object in an RFID tag corresponding to the object, such that the code is recorded in an AC of the RFID tag,
    wherein, in response to receiving a first activation mask comprising X bits, the RFID tag is configured to activate when the X bits of the first activation mask match the X bits of the first portion of the code recorded in the AC of the RFID tag, and
    wherein, in response to receiving a second activation mask comprising Y bits, the RFID tag is configured to activate when the Y bits of the second activation mask match the Y bits of the first and second portions of the code recorded in the AC of the RFID tag.

2. The method of claim 1, wherein the length of each activation code is between two bits and 96 bits.

3. The method of claim 1, wherein each of the codes is embodied as a K-bit binary number code.

4. The method of claim 1, further comprising:
    for a first object in the N number of objects, recording the code for the first object in an activation mask included in an activation command of an RFID reader.

5. The method of claim 1, wherein at least one of the RFID tags is a tag with a battery.

6. The method of claim 1, wherein the N number of objects comprises a first object and a second object, wherein the classification of the first object is different than the classification of the second object,
    wherein the plurality of RFID tags comprises a first RFID tag and a second RFID tag, wherein the first RFID tag corresponds to the first object and the second RFID tag corresponds to the second object, and
    wherein the first portion of the code for the first object is different than the first portion of the code for the second object.

7. The method of claim 6, wherein the sub-classification of the first object is different than the sub-classification of the second object, and wherein the second portion of the code for the first object is different than the second portion of the code for the second object.

8. The method of claim 1, wherein the plurality of RFID tags comprises a first RFID tag and a second RFID tag, and wherein the activation code for the first RFID tag is different than the activation code for the second RFID tag.

9. The method of claim 1, wherein the plurality of RFID tags comprises a first RFID tag, and wherein the length of the activation code for the first RFID tag is greater than K bits.

10. The method of claim 1, further comprising:
    for a first object in the N number of objects, recording the one or more bits of the code corresponding to the classification of the first object, but not the one or more bits of the code corresponding to the sub-classification of the first object, in an activation mask included in an activation command of an RFID reader.

11. The method of claim 1, further comprising:
for a first RFID tag in the plurality of RFID tags, recording the activation code for the first RFID tag in an activation mask included in an activation command of an RFID reader.

* * * * *